(12) United States Patent
Hirano et al.

(10) Patent No.: US 7,417,352 B2
(45) Date of Patent: Aug. 26, 2008

(54) BRUSH HOLDER AND MANUFACTURING METHOD THEREOF

(75) Inventors: Yoshinobu Hirano, Toyohashi (JP); Kenji Obata, Kosai (JP); Masakuni Masuda, Kosai (JP)

(73) Assignee: ASMO Co. Ltd., Shizuoka-Ken (JP)

( * ) Notice: Subject to any disclaimer, the term of this patent is extended or adjusted under 35 U.S.C. 154(b) by 428 days.

(21) Appl. No.: 11/360,169

(22) Filed: Feb. 22, 2006

(65) Prior Publication Data

US 2006/0137172 A1 Jun. 29, 2006

Related U.S. Application Data

(62) Division of application No. 10/393,669, filed on Mar. 19, 2003, now Pat. No. 7,032,290.

(30) Foreign Application Priority Data

Mar. 22, 2002 (JP) ............................. 2002-081728

(51) Int. Cl.
*H02K 13/00* (2006.01)
(52) U.S. Cl. ............................. 310/239; 310/71; 310/43
(58) Field of Classification Search .................. 310/43, 310/71, 89, 75 R, 239, 249
See application file for complete search history.

(56) References Cited

U.S. PATENT DOCUMENTS

| | | | | |
|---|---|---|---|---|
| 5,025,184 A | * | 6/1991 | Sekine et al. ................. | 310/71 |
| 5,063,317 A | * | 11/1991 | Bruhn ........................ | 310/91 |
| 5,159,221 A | * | 10/1992 | Miyazaki et al. ............ | 310/239 |
| 5,309,053 A | * | 5/1994 | Ade ............................. | 310/71 |
| 5,444,315 A | * | 8/1995 | Adam et al. .................. | 310/42 |
| 6,445,097 B1 | | 9/2002 | Zeiler et al. .................. | 310/71 |
| 6,573,625 B2 | * | 6/2003 | Shimizu et al. ............... | 310/71 |
| 6,796,852 B2 | | 9/2004 | Okamoto .................... | 439/736 |
| 6,809,454 B2 | * | 10/2004 | Adachi ....................... | 310/239 |
| 6,819,019 B2 | * | 11/2004 | Tamura et al. ............... | 310/71 |
| 2003/0102767 A1 | * | 6/2003 | Adachi ....................... | 310/239 |

FOREIGN PATENT DOCUMENTS

JP 09-329610 12/1997
WO WO 97/16883 5/1997

\* cited by examiner

*Primary Examiner*—Thanh Lam
(74) *Attorney, Agent, or Firm*—Sawyer Law Group, LLP

(57) ABSTRACT

A brush holder incorporates a terminal integral part, which has a coupling portion. The coupling portion couples the terminals with each other. The brush holder has a resin body and a plurality of terminals. The resin body has an opening. The terminals are embedded in the resin body. The terminals are coupled to each other by the coupling portion as an integral part before being embedded in the resin body. The coupling portion is exposed from the opening of the resin body. The terminals are separated from each other by cutting the coupling portion, which is exposed from the opening of the resin body. A coating member coats the opening of the resin body to insulate each terminal.

9 Claims, 11 Drawing Sheets

BRUSH HOLDER AND MANUFACTURING METHOD THEREOF

CROSS-REFERENCE TO RELATED APPLICATIONS

This application is a Divisional of pending U.S. Patent Application, entitled "Brush Holder And Manufacturing Method Thereof", Ser. No. 10/393,669, filed on Mar. 19, 2003 now U.S. Pat. No. 7,032,290.

BACKGROUND OF THE INVENTION

The present invention relates to a brush holder used for a motor and a manufacturing method of the brush holder.

A conventional brush holder is located inside a motor housing and includes a main body, which retains brushes, and a connector portion, which is integrally formed with the main body. The connector portion is exposed from the motor housing and is electrically connected to an external device. Terminals are embedded in the brush holder and extend from the connector portion to the main body of the brush holder.

The terminals include a first terminal, which receives power supply from the outside, and a second terminal, which sends out detection signals of a detector to the outside. The detector includes, for example, a rotation sensor, which detects rotational speed of the motor. The first and second terminals are apart from each other at a predetermined interval at the main body and the connector. In other words, the first and second terminals are insulated from each other.

The brush holder is formed of resin by injection molding. More specifically, resin is filled in a mold, with the first and second terminals placed in the mold, to form the brush holder.

In a case when the brush holder is molded with separate terminals placed in the mold, the procedure for placing the terminals in the mold is complicated. Therefore, in the conventional brush holder, a unit in which the terminals are coupled to each other at predetermined portions is placed in the mold. Then, resin is filled in the mold to form the brush holder. After that, the coupling portions between the terminals are cut.

The cut portions of the terminals are exposed from the brush holder. Therefore, liquid could enter from the exposed portion. Further, if any of the cut portions is in the vicinity of the brushes, foreign objects (such as brush powder scattered from the brushes) could enter from the exposed portion and cause a short-circuit at the cut portion of the terminals.

SUMMARY OF THE INVENTION

Accordingly, it is an objective of the present invention to provide a brush holder that reliably prevents short-circuit of terminals and a manufacturing method of the brush holder.

To achieve the above objective, the present invention provides a manufacturing method for a brush holder. The brush holder is located inside a motor housing and retains a brush. The method includes: forming a terminal integral part, which includes a plurality of terminals and a coupling portion, wherein the coupling portion couples the terminals with each other; molding a resin body to embed the terminal integral part, wherein the resin body forms at least part of the brush holder and has an opening from which the coupling portion is exposed; separating the terminals from each other by cutting the coupling portion, which is exposed from the opening of the resin body; and coating the opening of the resin body with a coating member to insulate the separated terminals from each other.

The present invention also provides a brush holder. The brush holder is located inside the motor housing and retains a brush. The brush holder incorporates a terminal integral part, which has a coupling portion. The coupling portion is located at a predetermined position and couples the terminals with each other. The brush holder has a resin body, a plurality of terminals and a coating member. The resin body forms at least part of the brush holder. The resin body has an opening. The terminals embedded in the resin body. The terminals are coupled to each other by the coupling portion as an integral part before being embedded in the resin body. The coupling portion is exposed from the opening of the resin body. The terminals are separated from each other by cutting the coupling portion, which is exposed from the opening of the resin body. The coating member coats the opening of the resin body to insulate each terminal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention will now be described with reference to FIGS. 1 to 6.

Figure 1:
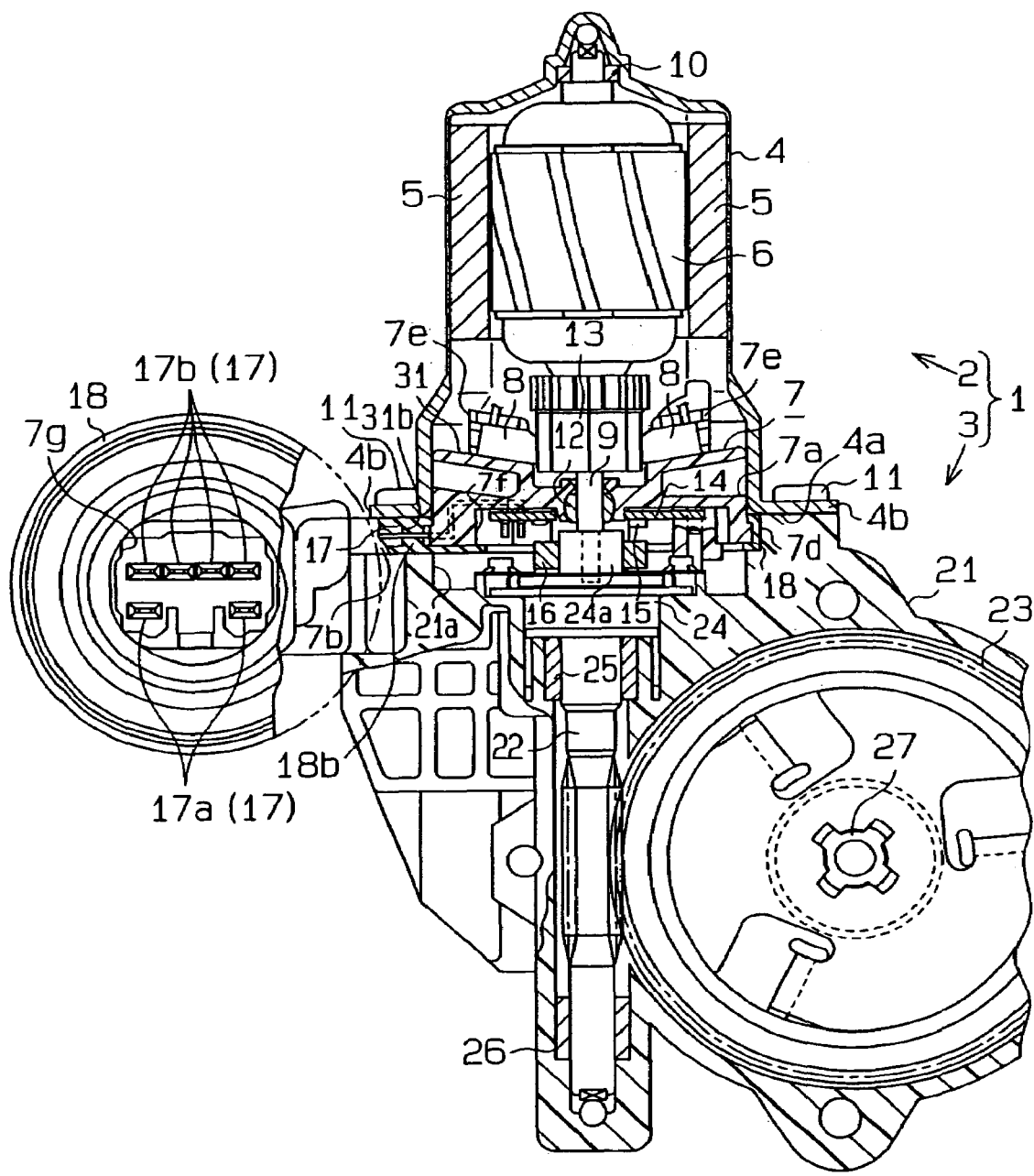
FIG. 1 is a cross-sectional view illustrating a motor according to a first embodiment of the present invention.

FIG. 1 shows a motor 1 of the preferred embodiment. The motor 1 is used for a power source of a power window system installed in a vehicle. The motor 1 includes a motor main body 2 and a reduction mechanism, which is a reduction gear 3.

The motor main body 2 includes a yoke housing member 4, which forms part of a motor housing, a pair of magnets 5, armature 6, a brush holder 7, and a pair of brushes 8.

The yoke housing member 4 is an inverted cup-shaped member. The pair of magnets 5 is secured to the inner circumferential surface of the yoke housing member 4. The armature 6 is rotatably accommodated inside the yoke housing member 4 radially inward of the magnets 5. The armature 6 has a rotary shaft 9. The proximal end of the rotary shaft 9 is rotatably supported by a bearing 10, which is attached to the center of the ceiling of the yoke housing member 4.

The yoke housing member 4 has an opening portion 4a. A pair of flanges 4b extends radially outward from the opening portion 4a. The yoke housing member 4 is secured to a gear housing member 21, which will be described later, by the flanges 4b and bolts 11.

Figure 2:
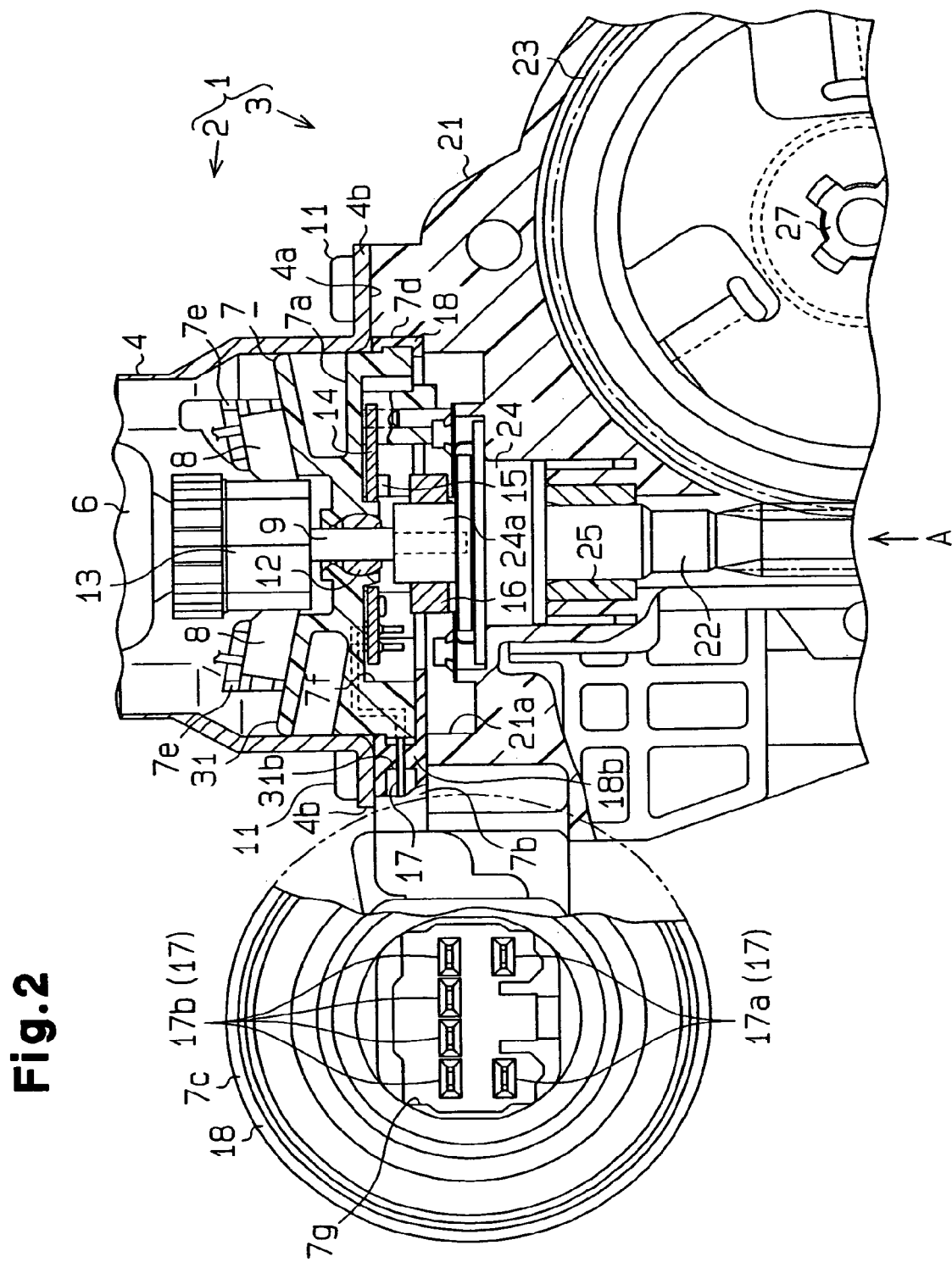
FIG. 2 is a partial cross-sectional view illustrating the motor shown in FIG. 1.
Figure 3:
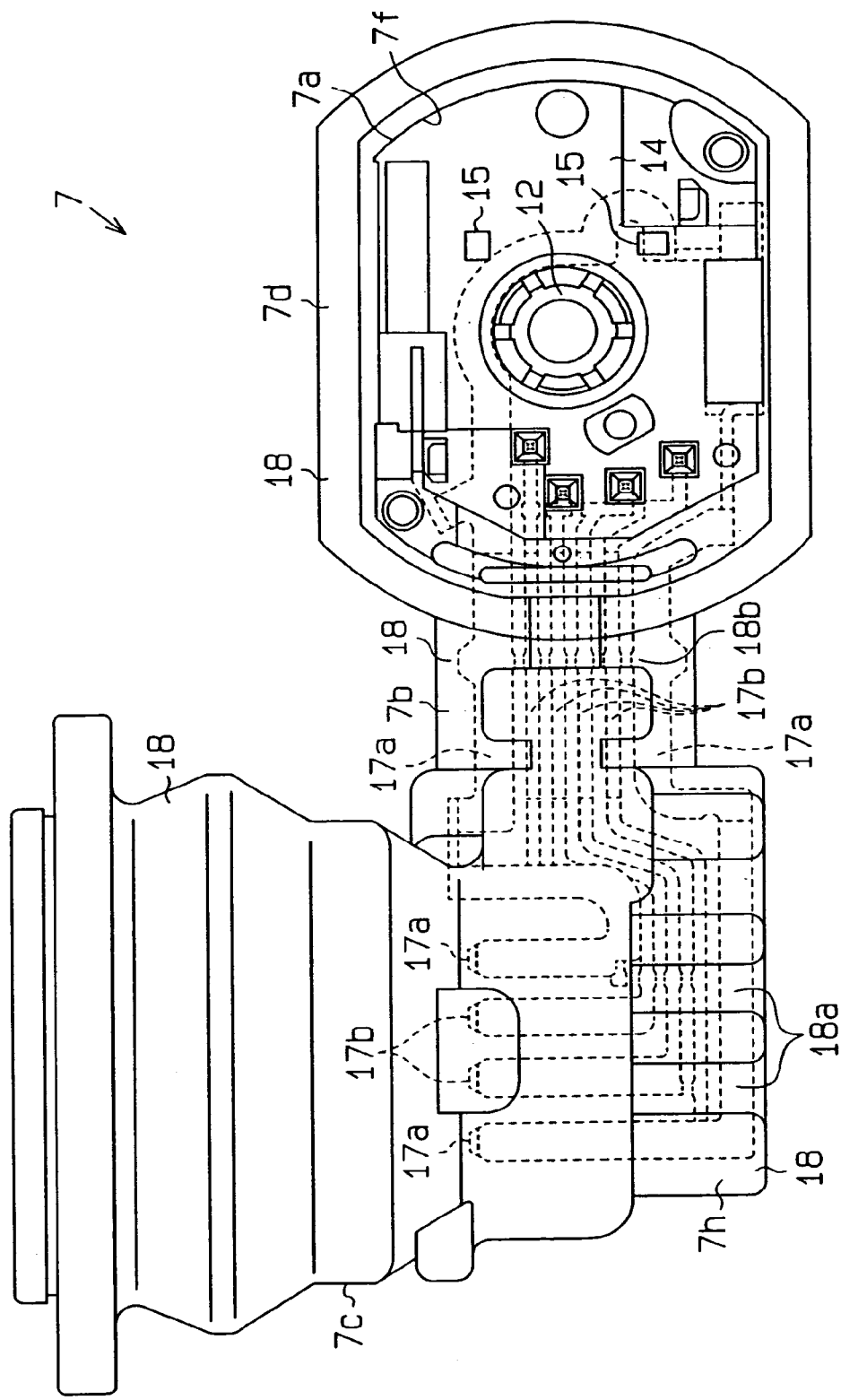
FIG. 3 is a view illustrating the brush holder of the motor in FIG. 1 from the direction indicated by an arrow A in FIG. 2.

The brush holder 7 is held between the flanges 4b of the yoke housing member 4 and an opening portion 21a of the gear housing member 21 (see FIGS. 2 and 3).

The brush holder 7 has a holder main body 7a, an extended portion 7b, and a connector portion 7c. The holder main body 7a substantially closes the opening portion 4a of the yoke housing member 4. The extended portion 7b extends radially outward from the holder main body 7a. The connector portion 7c is exposed outside the motor 1 from the extended portion 7b, and is electrically connected to an outside device.

A clamping portion 7d, which is connected to the extended portion 7b, is located around the outer circumferential portion of the holder main body 7a. The clamping portion 7d is held between the flanges 4b of the yoke housing member 4 and the opening portion 21a of the gear housing member 21 with the extended portion 7b.

A bearing 12 is attached to the substantial center of the holder main body 7a. The bearing 12 rotatably supports a predetermined portion of the distal end of the rotary shaft 9. A brush retainer 7e is formed on the holder main body 7a to retain the brushes 8. The brushes 8 slide against a commutator 13. The commutator 13 rotates integrally with the rotary shaft 9.

An accommodating recess 7f is formed in the holder main body 7a. A substrate 14 is attached to the accommodating recess 7f. The substrate 14 includes a pair of magnetometric sensors 15, which have hall elements. A rotary body 24a of a clutch 24, which will be described later, is coupled to the distal end of the rotary shaft 9 and rotates integrally with the rotary shaft 9. An annular sensor magnet 16 is secured to the rotary body 24a. The sensor magnet 16 is multipolarised in the circumferential direction. The sensor magnet 16 rotates integrally with the rotary shaft 9. The magnetometric sensors 15 detect information (such as the number of revolutions and the rotational speed) based on variation of the magnetic field of the sensor magnet 16, which rotates integrally with the rotary shaft 9.

Figure 4:
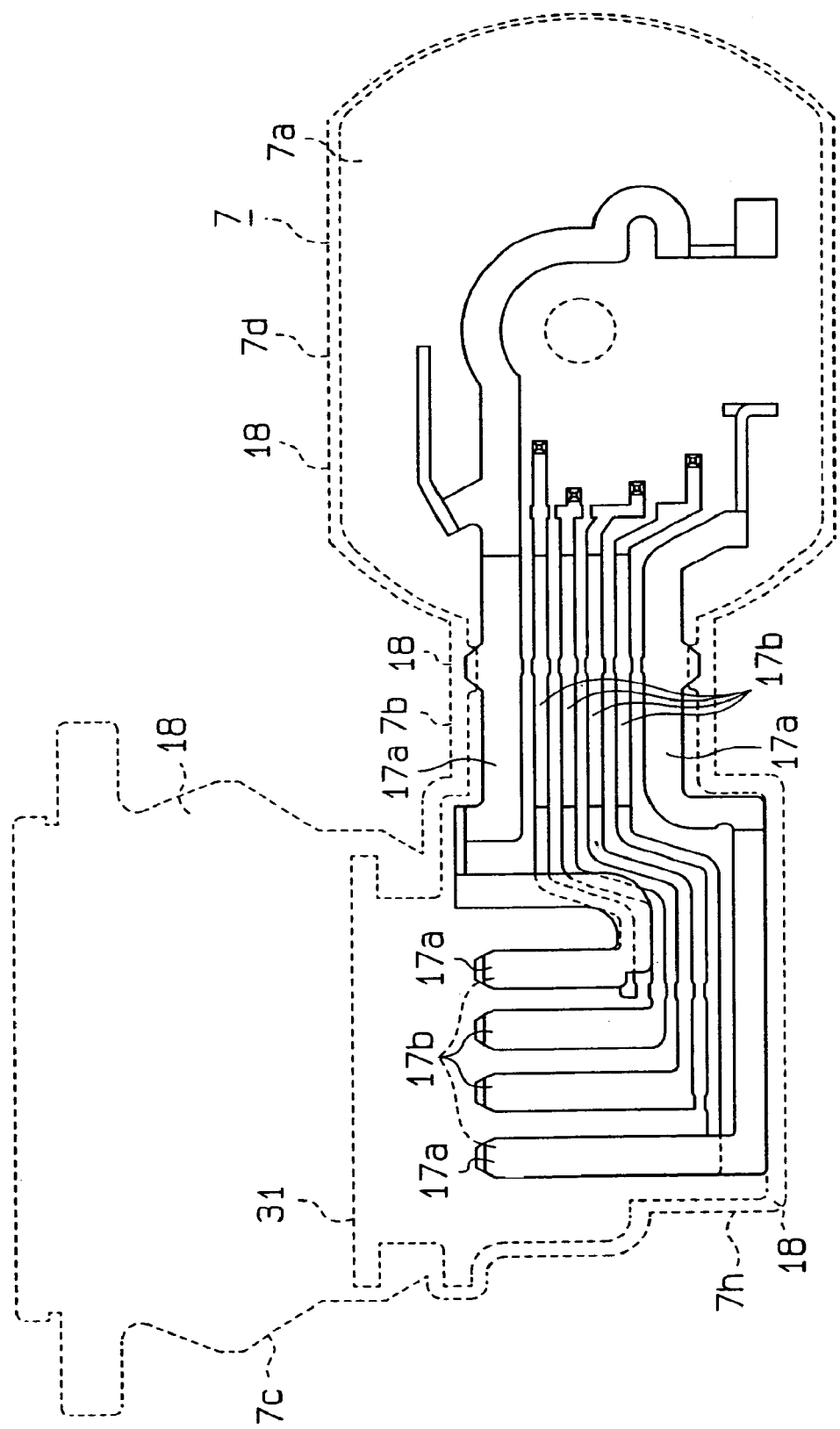
FIG. 4 is a view illustrating the terminals located inside the brush holder shown in FIG. 3.

As shown in FIGS. 3 and 4, six terminals 17 are embedded in the holder main body 7a, the extended portion 7b, and the connector portion 7c of the brush holder 7. Two of the terminals 17 are first terminals 17a used for power supply and the other four terminals 17 are second terminals 17b used for sending out signals. The first terminals 17a receive power supply from the outside, which then supply the power to the brushes 8. The second terminals 17b send out detection signals from the substrate 14 to the outside.

The first terminals 17a extend from the connector portion 7c to a predetermined position of the holder main body 7a via the extended portion 7b. The first terminals 17a are connected to the brushes 8. The entire widths of the first terminals 17a are substantially the same. The second terminals 17b extend from the connector portion 7c to a predetermined position of the holder main body 7a via the extended portion 7b. The second terminals 17b are connected to the substrate 14. The widths of portions of the second terminals 17b that are exposed inside an opening 7g of the connector portion 7c are the same as the widths of the first terminals 17a. The widths of other portions of the second terminals 17b that are embedded in the brush holder 7 are narrower than the widths of the first terminals 17a. The first and second terminals 17a, 17b are located substantially parallel to each other at predetermined intervals and insulated from each other.

The clamping portion 7d, the extended portion 7b, and the connector portion 7c of the brush holder 7 are coated by a sealing member 18. The sealing member 18 is formed of elastomer, which is elastic and insulative. The sealing member 18 is sandwiched between the opening portion 4a of the yoke housing member 4 and the opening portion 21a of the gear housing member 21 to hermetically seal the opening portions 4a and 21a. The sealing member 18 prevents foreign objects, such as liquid and dust, from entering the yoke housing member 4 and the gear housing member 21. The sealing member 18 also prevents foreign objects from entering the opening 7g of the connector portion 7c.

The reduction gear 3 shown in FIG. 1 includes the gear housing member 21, which forms part of the motor housing, a worm shaft 22, a worm wheel 23, and the clutch 24. The gear housing member 21 is made of resin and houses the worm shaft 22, the worm wheel 23, and the clutch 24. The gear housing member 21 has the opening portion 21a, which faces the opening portion 4a of the yoke housing member 4. The gear housing member 21 and the yoke housing member 4 are secured to each other by the bolts 11 with the brush holder 7 sandwiched in between.

The worm shaft 22 is rotatably supported by bearings 25, 26 located at predetermined positions inside the gear housing member 21. The worm shaft 22 is coupled to the rotary shaft 9, which extends from the motor main body 2, via the clutch 24. The clutch 24 transmits drive force of the rotary shaft 9 to the worm shaft 22 and locks rotation of the worm shaft 22 to prevent drive force from being transmitted from the worm shaft 22 to the rotary shaft 9.

The worm shaft 22 is meshed with the worm wheel 23. The worm wheel 23 is coupled to an output shaft 27, which is located perpendicular to the axial direction of the worm shaft 22. The output shaft 27 is coupled to an X-arm window regulator (not shown), which selectively opens and closes a window glass (not shown). When the output shaft 27 is rotated, the window regulator is activated to selectively open and close the window glass.

The brush holder 7 according to the preferred embodiment used in the motor 1 is manufactured as follows.

Figure 6:
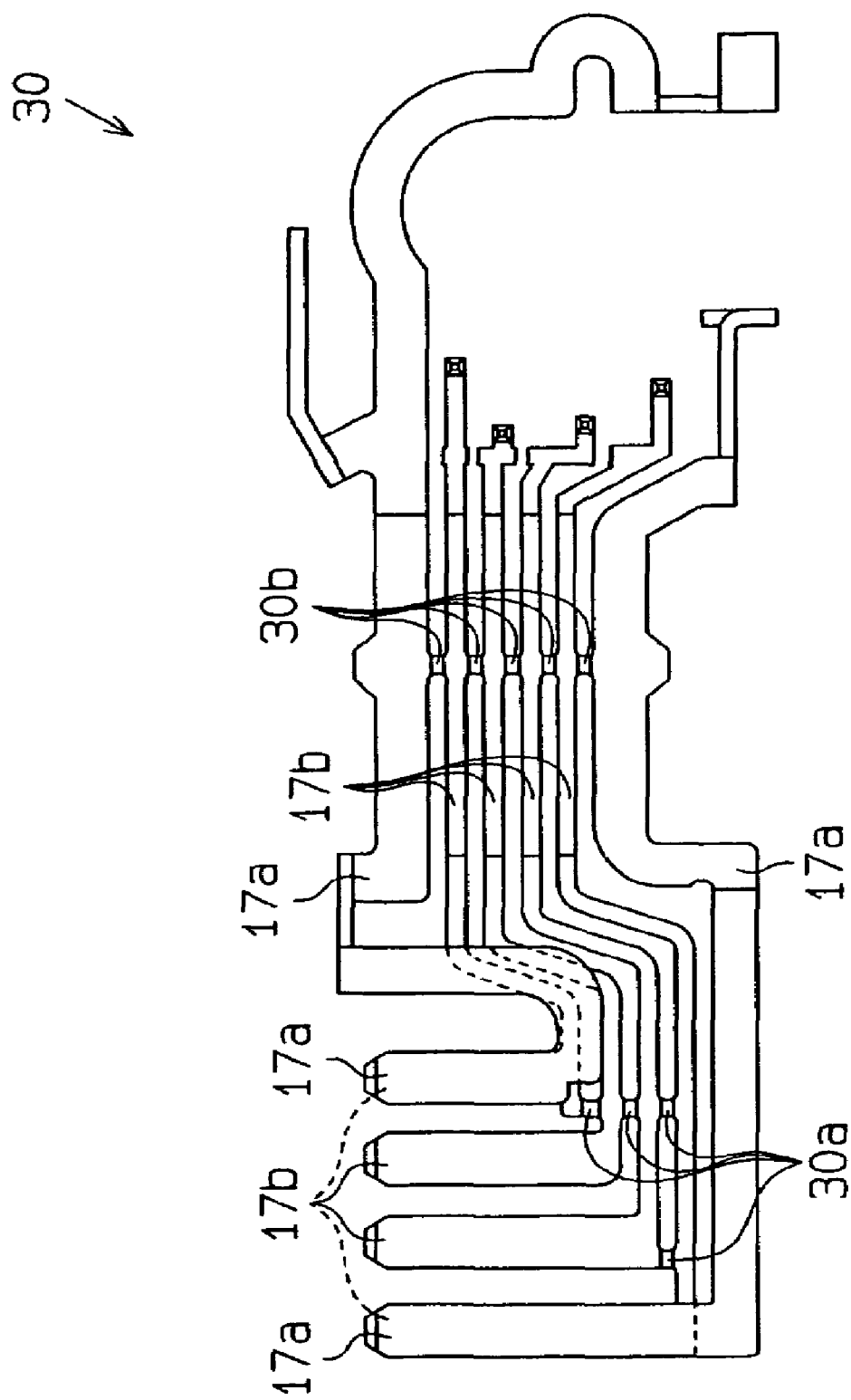
FIG. 6 is a view illustrating an integral part of the terminals of the brush holder shown in FIG. 3.

At first, a terminal integral part 30, which includes the first and second terminals 17a, 17b as one unit as shown in FIG. 6, is placed inside a first mold (not shown), which is used for molding the brush holder 7. The terminal integral part 30 includes first connecting portions 30a and second connecting portions 30b. The first connecting portions 30a connect the second terminals 17b with each other at a proximal end 7h of the connector portion 7c. The second connecting portions 30b connect the first and second terminals 17a, 17b with each other at the extended portion 7b of the connector portion 7c. The terminal integral part 30 is formed by punching a plate-like member, which is not shown, and folding the plate-like member into a predetermined shape.

Figure 5:
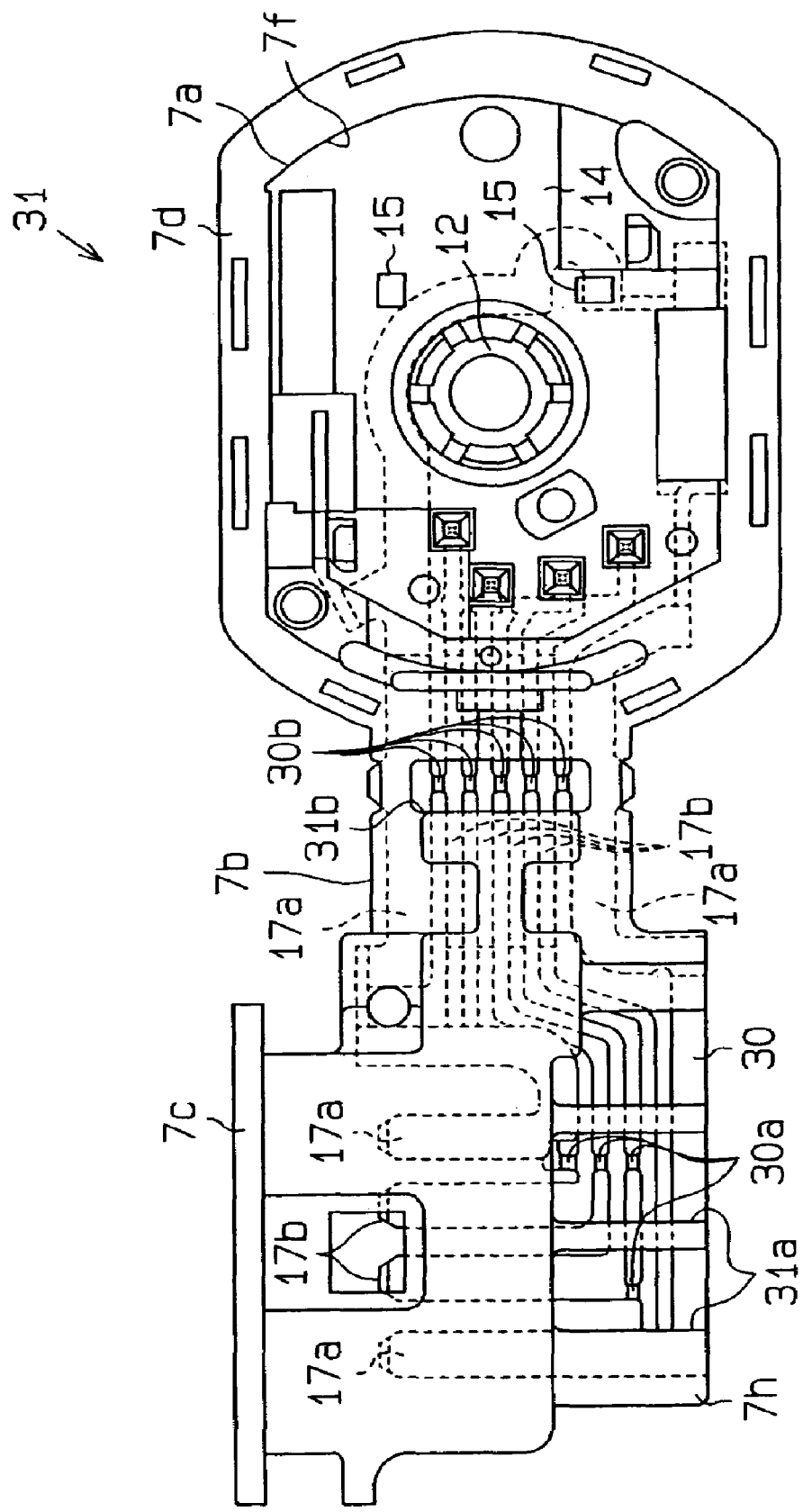
FIG. 5 is a view illustrating a resin body, which forms the brush folder shown in FIG. 3.

Then, resin is poured into the first mold in which the terminal integral part 30 is placed. As shown in FIG. 5, a resin body 31, which forms substantially the entire brush holder 7 (that is, substantially the entire portion of the holder main body 7a, the clamping portion 7d, the extended portion 7b, and the connector portion 7c), is formed. First openings 31a and a second opening 31b are formed in the resin body 31. The first connecting portions 30a of the terminal integral part 30 are exposed from the first openings 31a, and all the second connecting portions 30b are exposed from the second opening 31b.

The resin body 31, which forms the brush holder 7, is removed from the first mold. A tool (not shown) is inserted from each of the first and second openings 31a, 31b of the resin body 31 to cut the corresponding first or second connecting portions 30a, 30b of the terminal integral part 30 (see FIG. 4). The second connecting portions 30b are cut by a tool simultaneously. The first and second terminals 17a, 17b are separated and insulated from each other.

The resin body 31 is placed inside a second mold (not shown) to mold the sealing member 18 from elastomer onto the resin body 31. Elastomer is poured into the second mold to form the sealing member 18 integrally with the resin body 31, which forms the clamping portion 7d of the brush holder 7, the extended portion 7b, and the connector portion 7c. Elastomer, which forms the sealing member 18, is simultaneously filled in the first openings 31a located at the proximal end 7h of the connector portion 7c and the second opening 31b of the extended portion 7b. This forms terminal coating members 18a, which coat the first terminals 17a, and a terminal coating member 18b, which coats the second terminals 17b (see FIGS. 2 and 3). Each terminal coating member 18a or 18b prevents the corresponding first or second terminals 17a, 17b from being exposed from the corresponding first or second opening 31a, 31b. This prevents foreign objects, such as liquid or dust, from entering inside the first and second openings 31a, 31b. Thus, each first or second terminal 17a, 17b is prevented from being short-circuited.

The terminal coating member 18b, which fills the second opening 31b of the extended portion 7b, is sandwiched between the left side flange 4b (as viewed in FIG. 2) of the yoke housing member 4 and part of the gear housing member 21. Therefore, the terminal coating member 18b is reliably prevented from falling off.

The preferred embodiment provides the following advantages.

The terminal coating members 18a, 18b are formed to coat the first and second openings 31a, 31b of the resin body 31. Therefore, the terminal coating members 18a, 18b reliably prevent foreign objects from entering the first and second openings 31a, 31b where the first and second terminals 17a, 17b are exposed. Therefore, the first and second terminals 17a, 17b are reliably prevented from being short-circuited by foreign objects.

The terminal coating members 18a, 18b are integrally formed with the brush holder 7 and closely contact the opening portion 4a of the yoke housing member 4 and the opening portion 21a of the gear housing member 21. The terminal coating members 18a, 18b are formed of the same material as the sealing member 18, which seals the opening portions 4a, 21a. Therefore, the number of materials that form the brush holder 7 does not increase. Also, the terminal coating members 18a, 18b and the sealing member 18 can be made at the same time if the materials are the same.

The first and second connecting portions 30a, 30b of the terminal integral part 30 are formed at the extended portion 7b and the connector portion 7c. In other words, the first and second openings 31a, 31b need not be formed in the holder main body 7a to cut the first and second connecting portions 30a, 30b. Therefore, a space for arranging several components including the brushes 8 is reliably obtained in the holder main body 7a. This increases the flexibility of designing the brush holder 7.

The first and second connecting portions 30a, 30b of the terminal integral part 30 are located on at least two portions, which are the extended portion 7b and the connector portion 7c. Therefore, the first and second terminals 17a, 17b of the terminal integral part 30 are prevented from moving independently. This facilitates handling of the terminal integral part 30.

The second connecting portions 30b are cut with a tool at once. This facilitates cutting of the second connecting portions 30b.

The second opening 31b of the resin body 31 of the brush holder 7 and the terminal coating member 18b, which coats the second opening 31b, are arranged to be sandwiched between the yoke housing member 4 and the gear housing member 21. Therefore, the terminal coating member 18b is reliably prevented from falling off. Thus, foreign objects are more reliably prevented from entering the second opening 31b.

It should be apparent to those skilled in the art that the present invention may be embodied in many other specific forms without departing from the spirit or scope of the invention. Particularly, it should be understood that the invention may be embodied in the following forms.

The first and second connecting portions 30a, 30b of the terminal integral part 30 may be located at only one of the holder main body 7a, the extended portion 7b, and the connector portion 7c.

In the preferred embodiment, the first and second connecting portions 30a, 30b are located at the extended portion 7b and the connector portion 7c. However, the first and second connecting portions 30a, 30b may be located at any two of the holder main body 7a, the extended portion 7b, and the connector portion 7c.

The terminal coating members 18a, 18b, and the sealing member 18 may be made of different material. The terminal coating members 18a, 18b, and the sealing member 18 need not be formed simultaneously. The terminal coating members 18a, 18b may be made of elastic material other than elastomer, or material other than elastic material.

The structure of the brush holder 7 may be modified as required. The manufacturing procedure of the brush holder 7 may also be changed as required.

The sealing member 18 may be formed separately from the resin body 31. That is, a molded sealing member may be attached to a resin body afterwards (see FIGS. 7 to 11).

Figure 7:
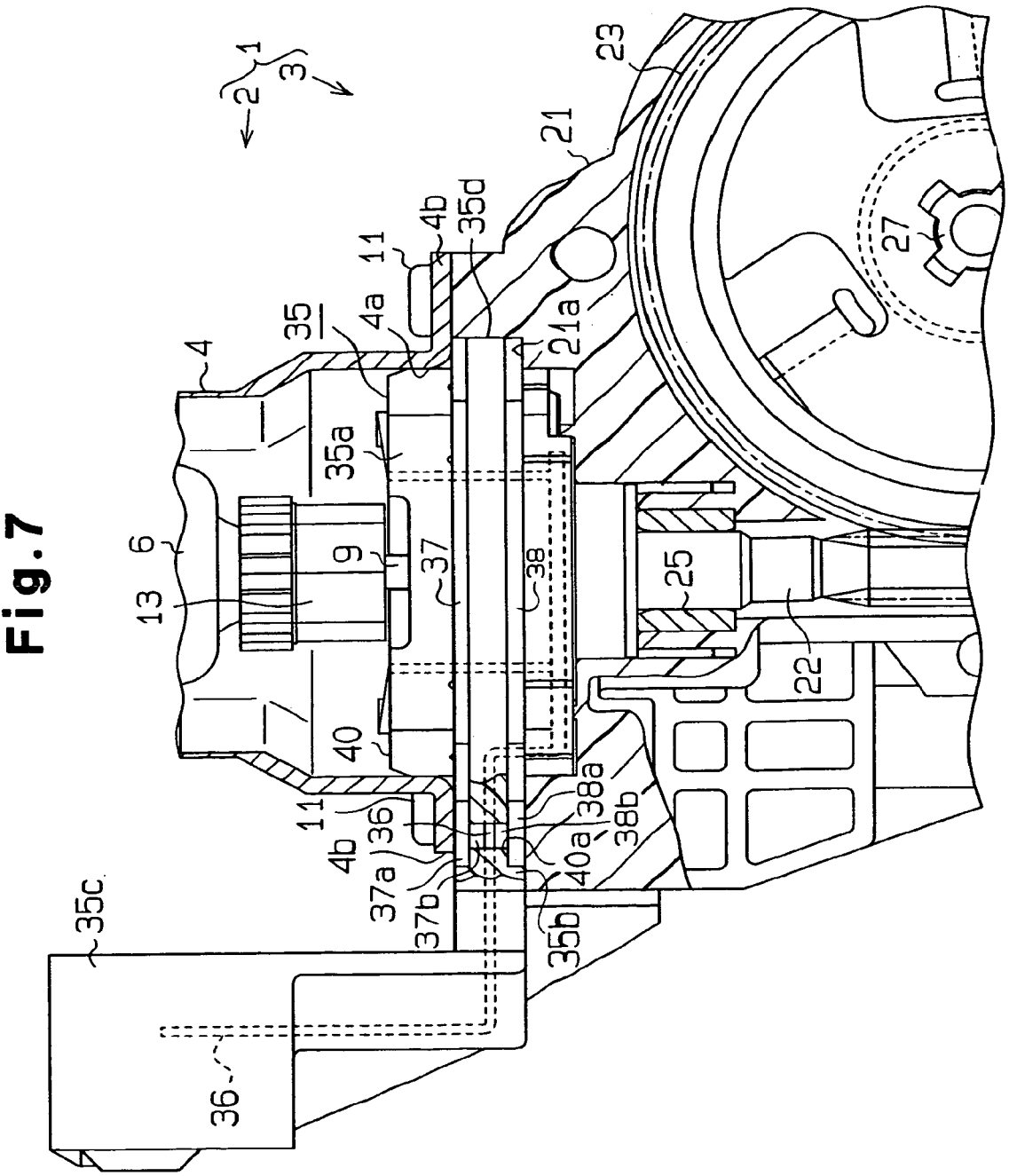
FIG. 7 is a partial cross-sectional view illustrating a modified embodiment of the motor.
Figure 8:
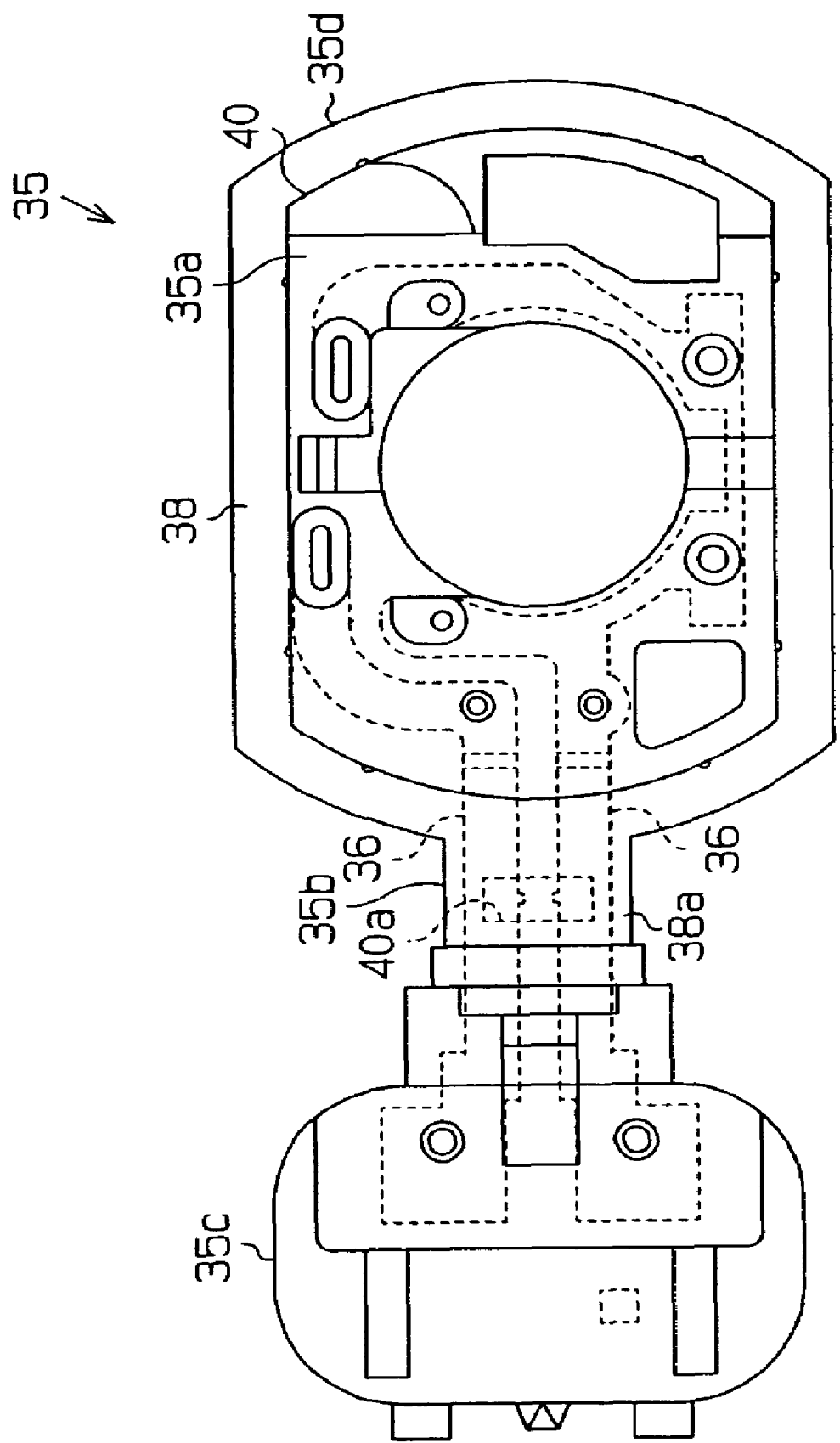
FIG. 8 is a view illustrating the brush holder of the modified embodiment of the motor shown in FIG. 7.

FIGS. 7 and 8 show a brush holder 35. As in the preferred embodiment of FIGS. 1 to 6, the brush holder 35 includes a holder main body 35a, an extended portion 35b, and a connector portion 35c. The holder main body 35a substantially closes the opening portion 4a of the yoke housing member 4. The extended portion 35b extends radially outward from the holder main body 35a. The connector portion 35c is exposed outside the motor 1 from the extended portion 35b, and is electrically connected to an outside device. A clamping portion 35d is located around the outer circumferential portion of the holder main body 35a. The clamping portion 35d extends from the extended portion 35b. The clamping portion 35d is sandwiched between the flanges 4b of the yoke housing member 4 and the opening portion 21a of the gear housing member 21 with the extended portion 35b.

Two first terminals 36 used for power supply are embedded in the holder main body 35a, the extended portion 35b, and the connector portion 35c of the brush holder 35 as shown in FIG. 8. The first terminals 36 extend from the connector portion 35c to a predetermined position of the holder main body 35a via the extended portion 35b, and are connected to brushes, which are not shown.

Figure 9:
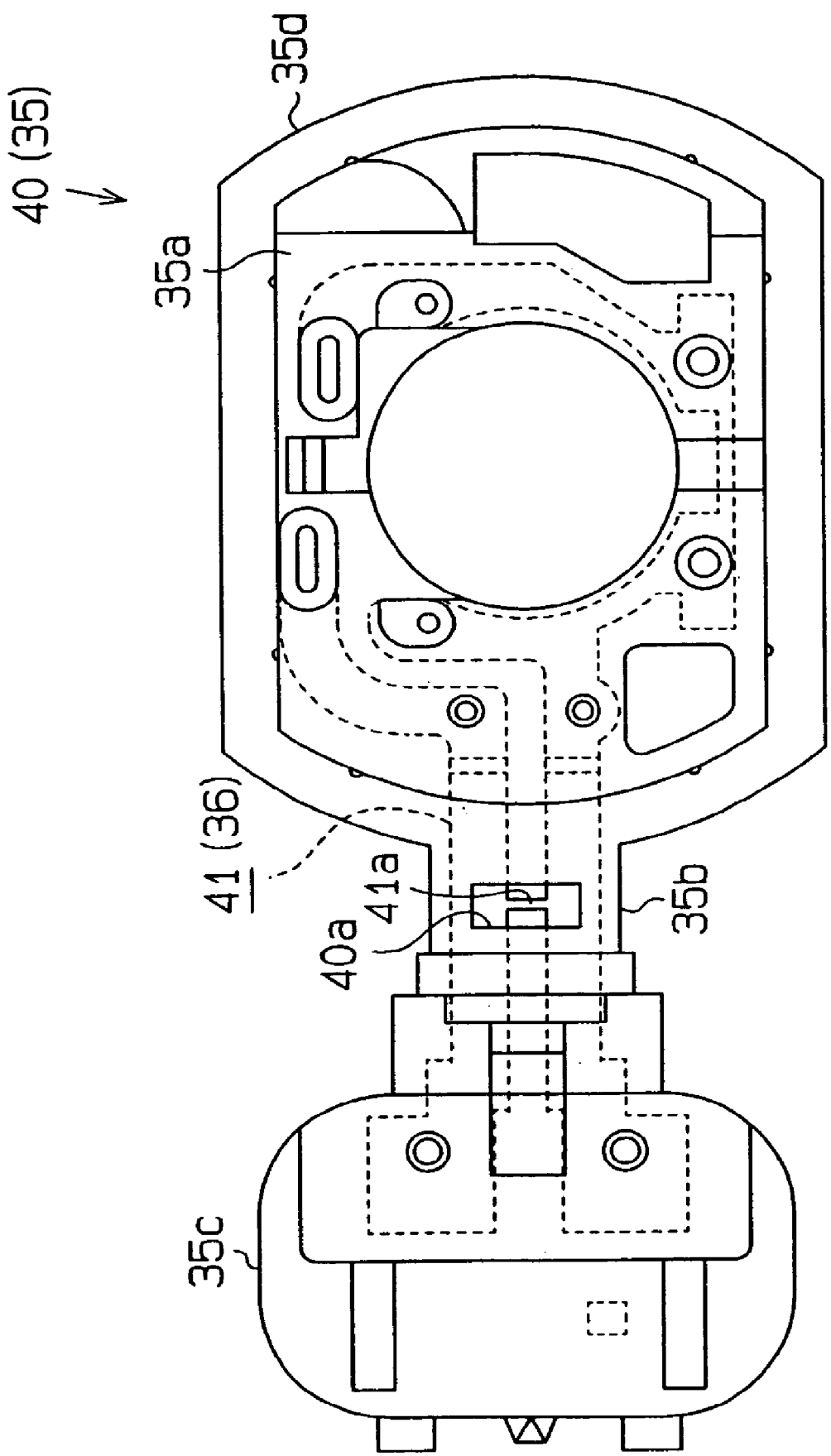
FIG. 9 is another view illustrating the brush holder shown in FIG. 8.

The brush holder 35 includes a resin body 40. As shown in FIG. 9, the resin body 40 is formed by insert-molding a terminal integral part 41. The terminal integral part 41 includes the first terminals 36, which are connected to each other by a connecting portion 41a. FIG. 8 shows a completed state of the brush holder 7. FIG. 9 shows a state before first and second sealing members 37, 38 are attached to the brush holder 7 and before the connecting portion 41a is cut. An engaging hole 40a, which exposes the connecting portion 41a of the terminal integral part 41, is formed in the extended portion 35b of the resin body 40. After the resin body 40 is molded, a tool (not shown) is inserted from the engaging hole 40a to cut the connecting portion 41a. Thus, the first terminals 36 are insulated from each other.

Figure 10:
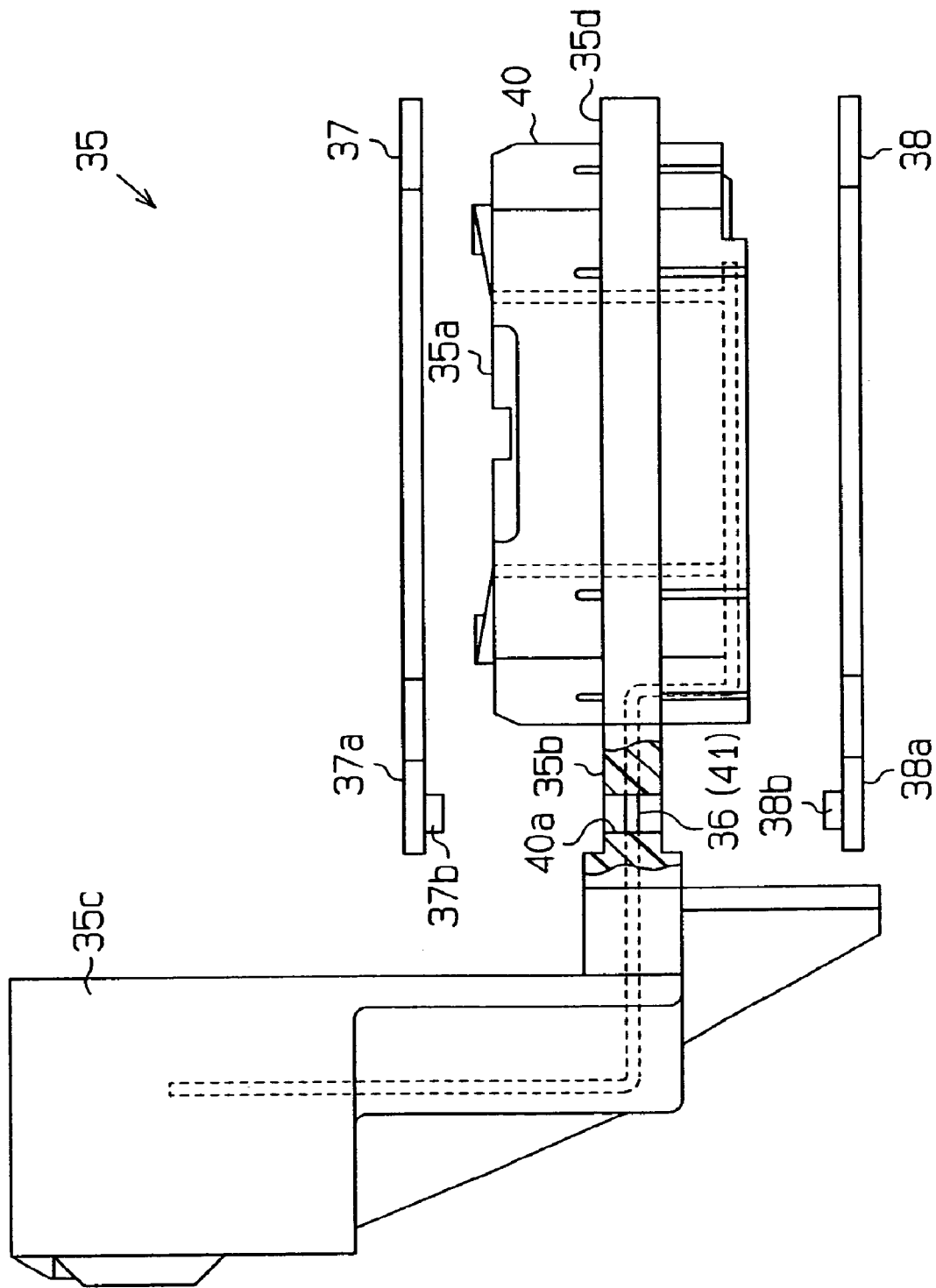
FIG. 10 is still another view illustrating the brush holder shown in FIG. 8.
Figure 11:
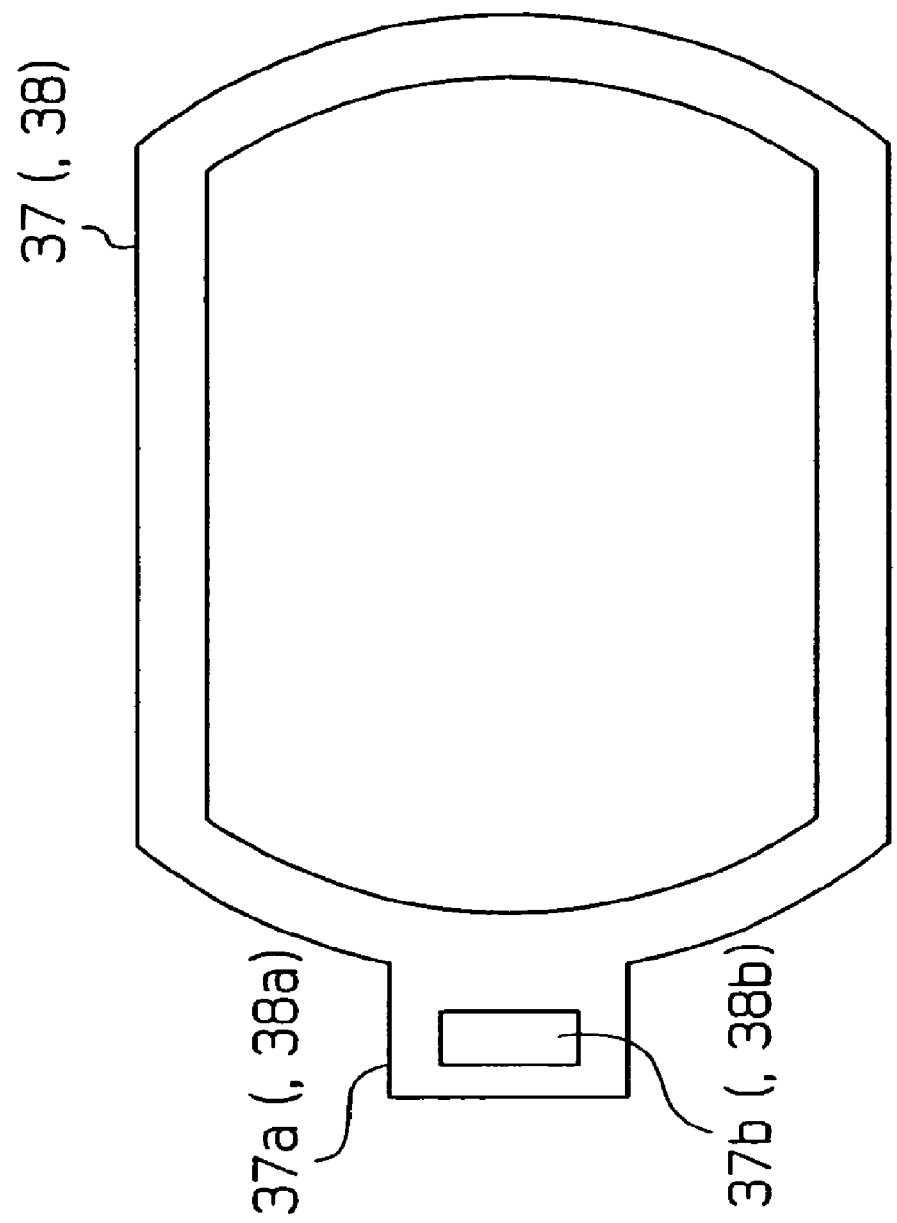
FIG. 11 is a view illustrating the sealing member of the modified embodiment.

The pair of first and second sealing members 37, 38 is attached to the clamping portion 35d and the extended portion 35b of the brush holder 35 as shown in FIGS. 10 and 11. The first and second sealing members 37, 38 are molded from elastomer, which is elastic and insulative, separately from the resin body 40. The first sealing member 37 closely contacts the opening portion 4a of the yoke housing member 4, and the second sealing member 38 closely contacts the opening portion 21a of the gear housing member 21. The first and second sealing members 37, 38 are sandwiched between the yoke housing member 4 and the gear housing member 21 so that the openings 4a, 21a are hermitically sealed. This prevents foreign objects, such as liquid and dust, from entering the yoke housing member 4 and the gear housing member 21.

The first and second sealing members 37, 38 have terminal coating members 37a, 38a, which hermetically seal the engaging hole 40a and prevent foreign objects from entering the engaging hole 40a. This prevents the first terminals 36 from causing short-circuit. Projections 37b, 38b are formed on the terminal coating members 37a, 38a, respectively. The projections 37b, 38b fit with both openings of the engaging hole 40a. The projections 37b, 38b may be omitted. The terminal coating members 37a, 38a are sandwiched between the left side flange 4b of the yoke housing member 4 and part of the gear housing member 21 as shown in FIG. 7. Therefore, the terminal coating members 37a, 38a are reliably prevented from falling off. Although the sealing members 37, 38 are attached to the resin body 40 as in the modified embodiment, the same advantages as the preferred embodiment shown in FIGS. 1 to 6 are provided.

The structure of the motor 1 may be changed as required. For example, the motor 1 may only include the motor main body 2, and the reduction gear 3 may be omitted. Also, a substrate that forms a control circuit for controlling the motor 1 may be provided.

Therefore, the present examples and embodiments are to be considered as illustrative and not restrictive and the invention is not to be limited to the details given herein, but may be modified within the scope and equivalence of the appended claims.

The invention claimed is:

1. A brush holder, which is attached to the motor housing to close an opening of the motor housing and retains a brush, the brush holder comprising:
 a resin body forming at least part of the brush holder, wherein the resin body has an opening;
 a plurality of terminals embedded in the resin body, wherein the terminals are coupled to each other by a coupling portion so as to form an integral part before being embedded in the resin body, wherein the coupling portion is exposed from the opening of the resin body, and wherein the terminals are separated from each other by cutting the coupling portion, which is exposed from the opening of the resin body;
 a sealing member provided on the resin body, the sealing member sealing the opening of the motor housing when the brush holder is attached to the motor housing; and
 a coating member for insulating the separated terminals from each other, wherein part of a material of the sealing member fills the opening of the resin body to form the coating member.

2. The brush holder according to claim 1, wherein the sealing member is molded integrally with the resin body.

3. The brush holder according to claim 1, wherein the sealing member is formed of elastic material.

4. The brush holder according to claim 3, wherein the elastic material is elastomer.

5. The brush holder according to claim 1, further comprising a main body, which is located inside the motor housing and retains the brush, an extended portion, which extends from the main body to the outside of the motor housing, and a connector portion, which is exposed outside the motor housing from the extended portion, wherein the coupling portion is located at a position corresponding to at least one of the extended portion and the connector portion.

6. The brush holder according to claim 1, further comprising a main body, which is located inside the motor housing retains the brush, an extended portion, which extends from the main body to the outside of the motor housing, and a connector portion, which is exposed outside the motor housing from the extended portion, wherein the coupling portion is one of coupling portions located at positions associated with at least two of the positions corresponding to the main body, the extended portion, and the connector portion.

7. The brush holder according to claim 1, wherein the coupling portion is one of a plurality of coupling portions, and wherein the coupling portions are exposed from the opening of the resin body.

8. The brush holder according to claim 7, wherein the coupling portions are cut at once.

9. The brush holder according to claim 1, wherein the motor housing includes a yoke housing and a gear housing, wherein the yoke housing forms part of a motor main body, which rotates a rotary shaft, wherein the gear housing accommodates a reduction mechanism, which is assembled to the yoke housing and reduces rotation of the rotary shaft, wherein the brush holder is held and fixed between the yoke housing and the gear housing, and wherein the opening of the resin body and the coating member are located at a portion of the brush holder, which is held between the yoke housing and the gear housing.

* * * * *